US008794667B2

(12) United States Patent
Bruzzone et al.

(10) Patent No.: US 8,794,667 B2
(45) Date of Patent: Aug. 5, 2014

(54) ROAD VEHICLE FRONT AIRBAG

(75) Inventors: Michela Bruzzone, Albenga (IT);
Veniero Pizzagalli, Serramazzoni (IT)

(73) Assignee: Ferrari S.p.A. (IT)

( * ) Notice: Subject to any disclaimer, the term of this patent is extended or adjusted under 35 U.S.C. 154(b) by 1090 days.

(21) Appl. No.: 12/675,603

(22) PCT Filed: Aug. 28, 2008

(86) PCT No.: PCT/IB2008/002222
§ 371 (c)(1),
(2), (4) Date: Aug. 9, 2011

(87) PCT Pub. No.: WO2009/027796
PCT Pub. Date: Mar. 5, 2009

(65) Prior Publication Data
US 2011/0285118 A1  Nov. 24, 2011

(30) Foreign Application Priority Data

Aug. 29, 2007  (IT) .............................. BO2007A0595

(51) Int. Cl.
B60R 21/231  (2011.01)
(52) U.S. Cl.
USPC ................. 280/743.1; 280/730.1; 280/731
(58) Field of Classification Search
USPC .......................................... 280/728.1–743.2
See application file for complete search history.

(56) References Cited

U.S. PATENT DOCUMENTS

| 5,615,910 | A | * | 4/1997 | Margetak et al. ............ 280/731 |
| 5,653,464 | A | * | 8/1997 | Breed et al. ................ 280/743.1 |
| 5,845,928 | A | * | 12/1998 | Nelsen et al. .............. 280/728.2 |
| 6,122,992 | A | * | 9/2000 | Papandreou ................... 74/552 |
| 6,572,144 | B2 | * | 6/2003 | Igawa ........................ 280/743.1 |
| 6,588,798 | B2 | * | 7/2003 | Bohn et al. ................. 280/743.1 |
| 6,607,210 | B2 | * | 8/2003 | Eckert et al. ................. 280/732 |
| 6,669,229 | B2 | * | 12/2003 | Thomas ........................ 280/732 |
| 6,892,605 | B2 | * | 5/2005 | Menjak ........................ 74/552 |
| 6,962,363 | B2 | * | 11/2005 | Wang et al. .................. 280/729 |
| 7,198,290 | B2 | * | 4/2007 | Yamada et al. ............... 280/731 |
| 7,318,604 | B2 | * | 1/2008 | Miller ........................ 280/743.1 |

(Continued)

FOREIGN PATENT DOCUMENTS

| DE | 3505927 A1 | 8/1986 |
| DE | 4010796 C1 | 5/1991 |

(Continued)

OTHER PUBLICATIONS

"European Application Serial No. EP10163669.4, European Search Report dated Jun. 30, 2010", 5 pgs.

(Continued)

*Primary Examiner* — Paul N Dickson
*Assistant Examiner* — Timothy Wilhelm
(74) *Attorney, Agent, or Firm* — Schwegman Lundberg & Woessner, P.A.

(57) ABSTRACT

A front airbag for a road vehicle; the front airbag having: a stowage compartment formed in a front portion of the dashboard of the road vehicle; a bag normally deflated and folded inside the stowage compartment; and a generator which is housed inside the stowage compartment, is connected to the bag, and inflates the bag in the event of collision; the inflated bag has a longitudinal depth that decreases substantially in a thrust direction perpendicular to a longitudinal axis of the road vehicle.

2 Claims, 4 Drawing Sheets

(56) References Cited

U.S. PATENT DOCUMENTS

| | | | |
|---|---|---|---|
| 7,371,445 B2 * | 5/2008 | Keshavaraj | 428/35.2 |
| 7,380,828 B2 * | 6/2008 | Menjak et al. | 280/779 |
| 7,635,148 B2 * | 12/2009 | Sager | 280/739 |
| 7,740,275 B2 * | 6/2010 | Kwon et al. | 280/743.1 |
| 7,823,909 B2 * | 11/2010 | Williams et al. | 280/728.2 |
| 7,845,682 B2 * | 12/2010 | Lachat et al. | 280/743.1 |
| 7,866,693 B2 * | 1/2011 | Onohara et al. | 280/743.1 |
| 7,878,540 B2 * | 2/2011 | Takimoto et al. | 280/743.2 |
| 7,931,296 B2 * | 4/2011 | Choi | 280/731 |
| 7,942,442 B2 * | 5/2011 | Rose et al. | 280/743.1 |
| 2004/0026909 A1 * | 2/2004 | Rensinghoff | 280/732 |
| 2004/0207186 A1 * | 10/2004 | Kai | 280/731 |
| 2005/0062270 A1 * | 3/2005 | Kai | 280/731 |
| 2005/0275201 A1 * | 12/2005 | Schneider et al. | 280/731 |
| 2006/0076758 A1 * | 4/2006 | Yokoyama | 280/730.1 |
| 2006/0197324 A1 * | 9/2006 | Klinkenberger | 280/731 |
| 2006/0232050 A1 * | 10/2006 | Kumagai et al. | 280/730.1 |
| 2007/0024042 A1 * | 2/2007 | Onohara et al. | 280/743.1 |
| 2008/0257103 A1 * | 10/2008 | Greppi | 74/557 |

FOREIGN PATENT DOCUMENTS

| | | |
|---|---|---|
| DE | 29700804 U1 | 4/1997 |
| DE | 10322612 A1 | 12/2004 |
| DE | 102005026840 A1 | 11/2007 |
| EP | 1607275 A1 | 12/2005 |
| EP | 1686017 A1 | 8/2006 |
| WO | WO-93/16902 A1 | 9/1993 |
| WO | WO-97/36770 A1 | 10/1997 |

OTHER PUBLICATIONS

"International Application Serial No. PCT/IB2008/002222, International Search Report Mar. 27, 2009", 6 pgs.

"International Application Serial No. PCT/IB2008/002222, Written Opinion mailed Mar. 27, 2009", 12 pgs.

"European Application Serial No. EP10163668.6, European Search Report dated Jun. 22, 2010", 5 pgs.

* cited by examiner

ROAD VEHICLE FRONT AIRBAG

RELATED APPLICATIONS

This application is a nationalization under 35 U.S.C. 371 of PCT/IB2008/002222, filed Aug. 28, 2008 and published as WO 2009/027796 A2 on Mar. 5, 2009, which claimed priority under 35 U.S.C. 119 to Italian Patent Application Serial No. B02007A000595, filed Aug. 29, 2007; which applications and publication are incorporated herein by reference and made a part hereof.

TECHNICAL FIELD

The present invention relates to a road vehicle front airbag.

The present invention may be applied to advantage to a high-performance sports car driver's airbag, to which the following description refers purely by way of example.

BACKGROUND

A car driver's airbag is designed, in the event of a head-on or glancing collision (e.g. with an obstacle at 30° to the travelling direction of the car), to prevent the driver's trunk and head from hitting the steering wheel and rigid vehicle body parts in front of the driver, such as the frame posts or windscreen. The risk of this happening increases in inverse proportion to the size of the passenger compartment, i.e. the initial distance between the driver's trunk and head and the rigid vehicle body parts in front of the driver.

In a high-performance sports car, the size (particularly the height) of the passenger compartment is fairly small, to reduce the size of the front section of the car, and so increases the risk, in the event of a head-on or glancing collision without a seat belt, of the driver's trunk and head hitting the rigid vehicle body parts in front. To prevent this from happening, high-performance sports cars must therefore often be equipped with a high-volume driver's airbag (e.g. of at least 70 liters or even more). Using a high-volume driver's airbag, however, has drawbacks, by requiring a large, bulky airbag stowage compartment in the steering wheel hub, thus impairing the look of the steering wheel; and a high-power airbag inflation generator, which is more dangerous to the driver if the driver should be in an usual driving position, e.g. resting part of the body (such as a hand, forearm or head) on the steering wheel hub, when the airbag is inflated.

SUMMARY

Examples of the present subject matter provide a road vehicle front airbag designed to eliminate the aforementioned drawbacks, and which is cheap and easy to produce.

According to the present subject matter, there is provided a road vehicle front airbag as claimed in the accompanying Claims.

BRIEF DESCRIPTION OF THE DRAWINGS

A non-limiting embodiment of the present invention will be described by way of example with reference to the accompanying drawings, in which.

DETAILED DESCRIPTION

Figure 1:
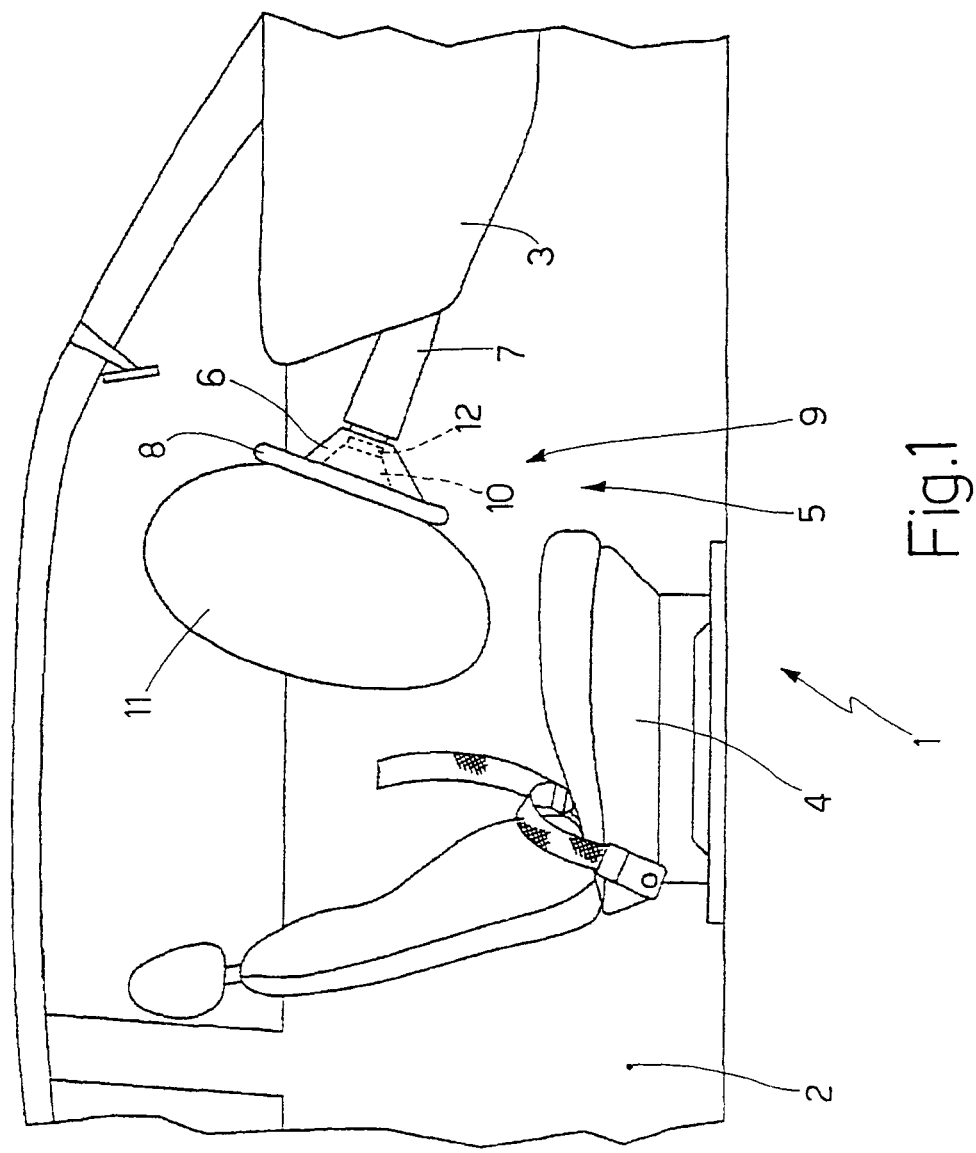
FIG. 1 shows a schematic side view of a car featuring a driver's airbag in accordance with the present invention.

Number 1 in FIG. 1 indicates as a whole a car comprising a passenger compartment 2 bounded at the front by a dashboard 3 and housing two front seats 4 (only one shown in FIG. 1). A front left seat 4 (shown in FIG. 1) is the driver's seat, and is located facing a steering wheel assembly 5, which extends from dashboard 3 and provides for steering the front wheels (not shown). Steering wheel assembly 5 comprises a central hub 6 connected rigidly to a free end of a steering column 7 (shown in FIG. 2); and a steering wheel 8 extending about central hub 6 and mounted for rotation on steering column 7.

Steering wheel assembly 5 is equipped with a driver's airbag 9 which, in the event of a head-on or glancing collision (e.g. with an obstacle at 30° to the travelling direction of the car), prevents the driver's trunk and head from hitting steering wheel assembly 5 and rigid vehicle body parts in front of the driver, such as the frame posts or windscreen.

Driver's airbag 9 comprises a stowage compartment 10 formed in central hub 6 of steering wheel assembly 5 (i.e. in a front portion of dashboard 3); a bag 11 which is normally deflated and folded inside stowage compartment 10; and a generator 12 (typically an explosive charge set off electrically by an impact sensor), which is housed inside stowage compartment 10, is connected to bag 11, and inflates bag 11 in the event of impact. Stowage compartment 10 is closed at the top by a lid which is opened automatically by inflation of bag 11.

Figure 2:
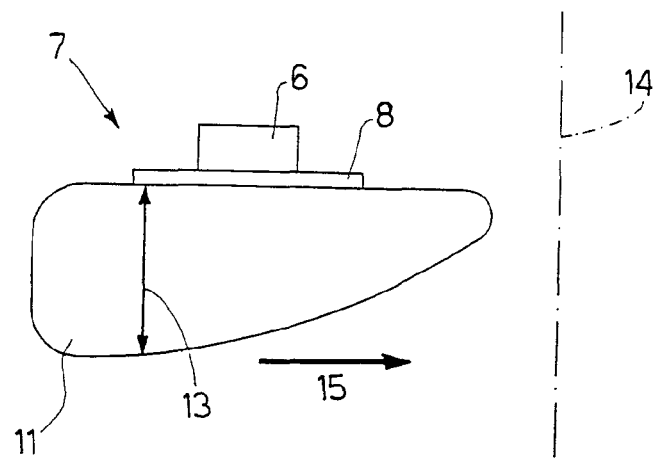
FIG. 2 shows a schematic top plan view of the FIG. 1 driver's airbag.

As shown in FIG. 2, when inflated, bag 11 has a longitudinal depth 13 (i.e. measured along a longitudinal axis parallel to the central longitudinal axis 14 of car 1) that decreases substantially in a transverse thrust direction 15 (i.e. perpendicular to longitudinal axis 14 of car 1) from the side to the centre of car 1 (from left to right of the left-hand-drive car 1 shown), so that the longitudinal depth 13 of the inflated bag 11 is maximum on the side facing the side of car 1, and is minimum on the side facing the centre of car 1.

In the event of a head-on or glancing collision, the driver's body, on impact with the inflated bag 11, is thrown towards the centre of car 1, where the rigid vehicle body parts in front of the driver are furthest away, i.e. the driver's body is thrown away from the side of car 1, where the rigid vehicle body parts in front of the driver are closest, thus preventing the driver's trunk and head from striking the rigid vehicle body parts in front. This thrust towards the centre of car 1 is less (though still) useful in the case of a head-on collision, in which the driver's body only travels longitudinally, but is essential in the case of a glancing collision, in which the driver's body travels both longitudinally and laterally towards the side of car 1. In other words, in the event of a glancing collision, the centreward thrust imparted to the driver's body by the inflated bag 11 compensates the tendency of the driver's body to move sideways towards the side of car 1.

This is achieved by virtue of the shape of the inflated bag 11, the longitudinal depth 13 of which decreases substantially in a transverse thrust direction from the side to the centre of car 1. In one embodiment, the inflated bag 11 has a longitudinal depth 13 (i.e. measured along a longitudinal axis parallel to the central longitudinal axis 14 of car 1) that decreases substantially in a vertical upward thrust direction 15 (i.e. perpendicular to longitudinal axis 14 of car 1), so that the longitudinal depth 13 of the inflated bag 11 is maximum at the bottom and minimum at the top. This shape of the inflated bag 11 so balances the forces acting on the driver's body, in the event of a head-on or glancing collision, as to restrain the driver's pelvic region first, and promote rotation of the driver's torso to keep the driver's head trajectory well down (i.e. away from the roof of car 1) with no other safety devices required.

In one embodiment, the ratio of the maximum longitudinal depth 13 of the inflated bag 11 on the side facing the side of car 1 to the minimum longitudinal depth 13 of the inflated bag 11 on the side facing the centre of car 1 ranges between 1.3 and 2, so the mean angle of the front surface of the inflated bag 11 ranges between 10° and 30°. Bag 11 being a limp inflatable body that is inevitably curved when inflated, reference is made to the mean angle, on account of the variation in the local angle of the front surface of inflated bag 11.

It is important to note that bag 11 described above is asymmetrical, i.e. is not circularly symmetrical like conventional driver's airbags, so driver's airbag 9 is preferably housed in a fixed central hub 6 (i.e. that does not rotate together with steering wheel 8) to ensure bag 11 is oriented as designed in the event of collision. In other words, if central hub 6, instead of being fixed, were to rotate together with steering wheel 8, bag 11, in the event of collision, may be oriented otherwise than as designed (in the worst case scenario, even in the opposite position, which would not only make it ineffective, but would even produce the opposite effect to the one desired).

In the FIGS. 1 and 2 embodiment, thrust direction 15 is crosswise. In other embodiments, thrust direction 15 may still be perpendicular to the longitudinal axis 14 of the car, but not crosswise. For example, thrust direction 15 may be vertical or halfway between the vertical direction and transverse (horizontal) direction.

Figure 3:
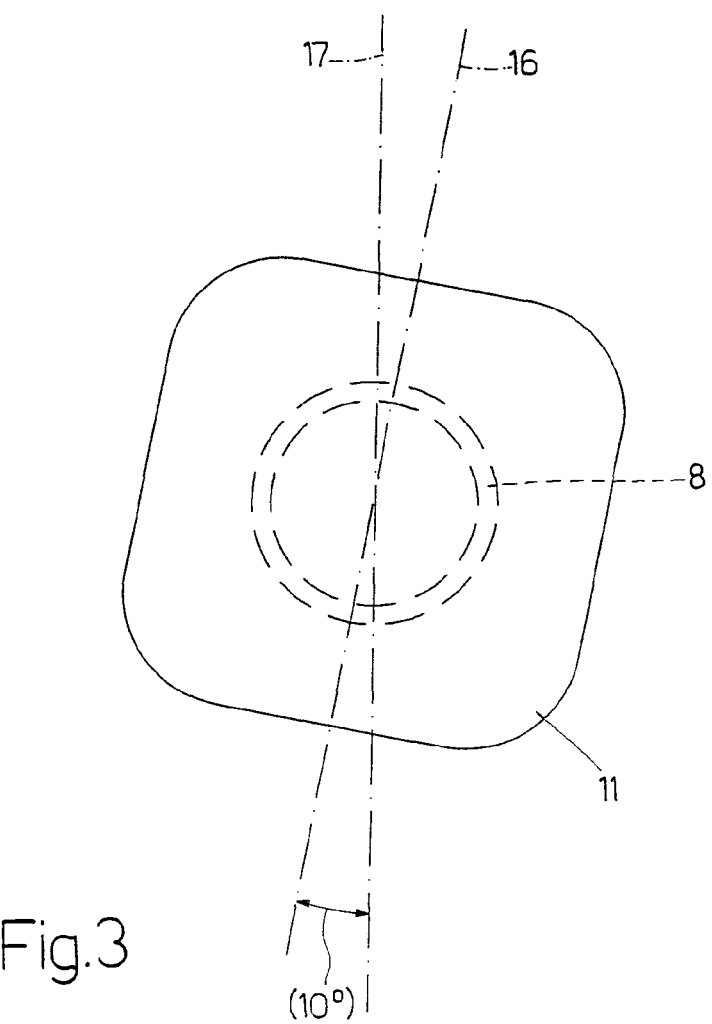
FIG. 3 shows a schematic front view of a different embodiment of a driver's airbag in accordance with the present invention.

In the FIG. 3 embodiment, the inflated bag 11 has a square (as opposed to conventional round) front section, and has a vertical axis 16 of symmetry sloping towards the centre of car 1 with respect to a vertical axis 17 of symmetry of stowage compartment 10. More specifically, the vertical axis 16 of symmetry of the inflated bag 11 slopes towards the centre of car 1 with respect to the vertical axis 17 of symmetry of stowage compartment 10 by an angle of substantially 8° to 30°, and preferably of about 10°.

By sloping towards the centre of car 1, the inflated bag 11 provides greater protection on the side facing the side of car 1 than on the side facing the centre of car 1; which difference is determined by the distance between the driver and the rigid vehicle body parts in front of the driver being minimum on the side facing the side of car 1, and maximum on the side facing the centre of car 1.

The FIG. 3 bag 11 is also asymmetrical, i.e. is not circularly symmetrical like conventional driver's airbags, so driver's airbag 9 is preferably housed in a fixed central hub 6 (i.e. that does not rotate together with steering wheel 8) to ensure bag 11 is oriented as designed in the event of collision.

Figure 4:
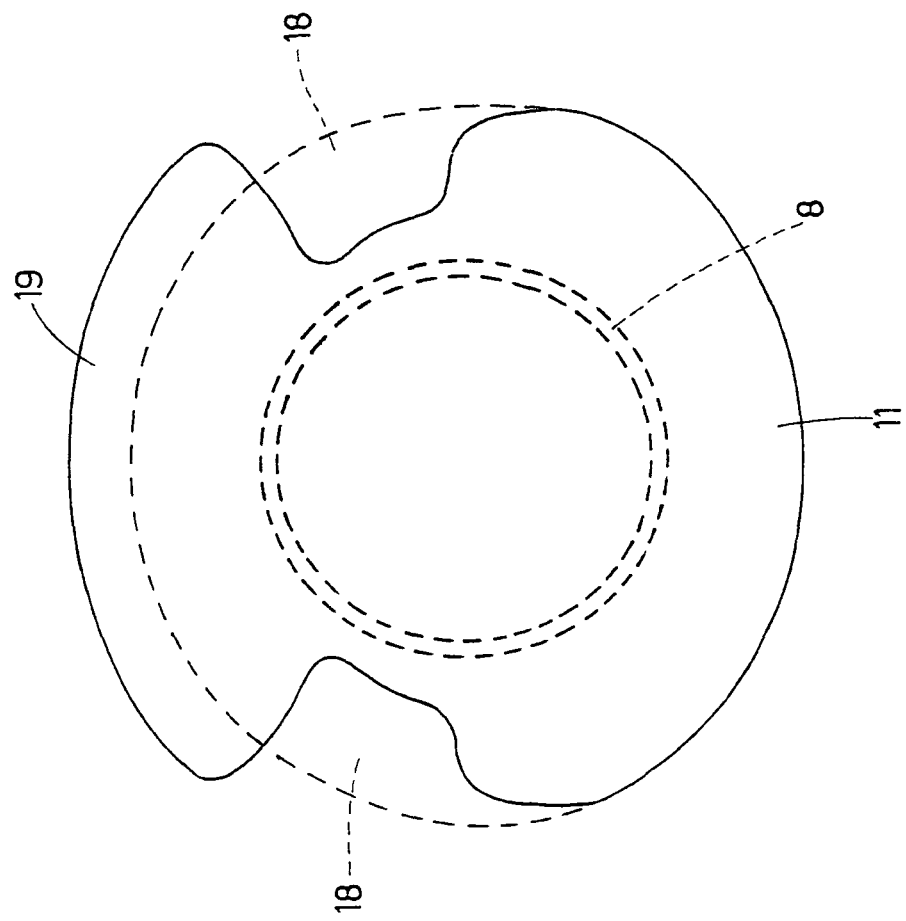
FIG. 4 shows a schematic front view of a further embodiment of a driver's airbag in accordance with the present invention.
Figure 5:
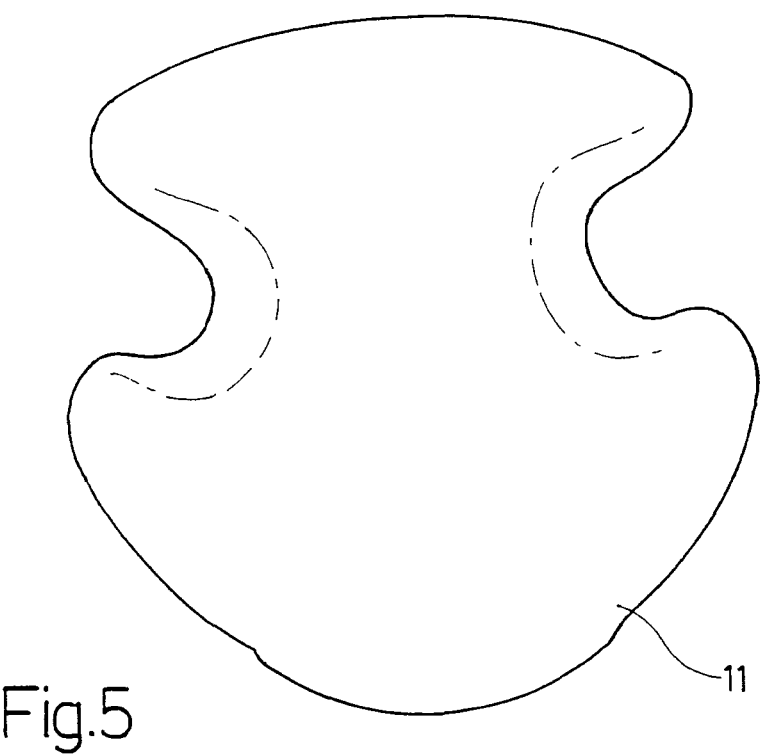
FIG. 5 shows a schematic view in perspective of the driver's airbag in FIG. 4.
Figure 6:
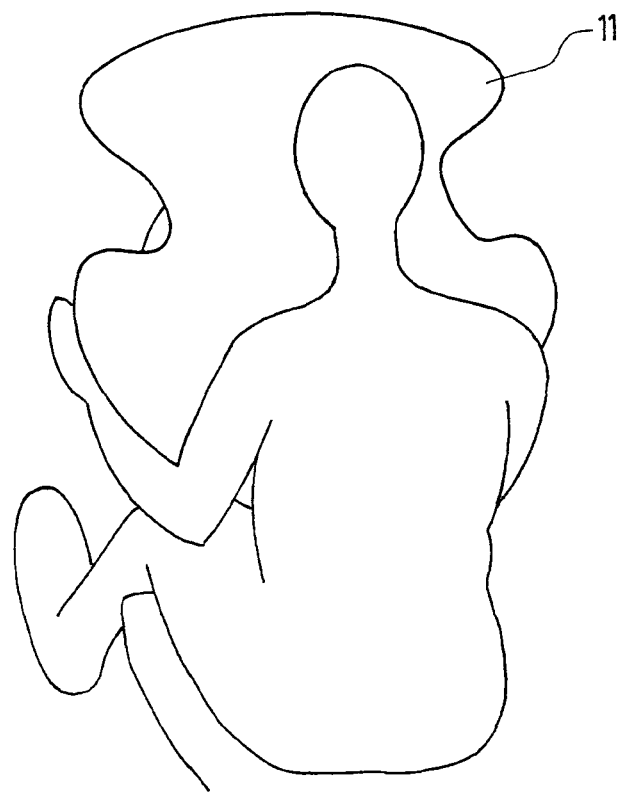
FIG. 6 shows a schematic view in perspective of interaction between the FIG. 4 driver's airbag and the driver.

In the FIGS. 4, 5 and 6 embodiment, the inflated bag 11 has a circular front section, except for two voids 18 on opposite sides, and an additional volume at the top.

The additional volume 19 has an arc-shaped front section extending a total of about 90°, and equal in height to roughly 20% of the radius of the front section of inflated bag 11. For example, with a roughly 40 cm front section radius of inflated bag 11, the front section of additional volume 19 is roughly 8 cm high.

The two voids 18 extend up to the start of additional volume 19, are substantially located in the top half of inflated bag 11, and each extend roughly 60°. In other words, using the vertical axis 16 of symmetry of inflated bag 11 as an angular reference (i.e. 0°), addition volume 19 extends between −45° (i.e. 45° to the left in FIG. 4) and +45° (i.e. 45° to the right in FIG. 4); the left void 18 extends between −45° and −105°; and the right void 18 extends between +45° and +105°.

The inflated bag 11 in FIGS. 4, 5 and 6 includes two voids 18 in a "superfluous" area (i.e. that does not come into contact with the driver's body in the event of head-on or glancing collision); and an additional volume 19 in an "essential" area (i.e. that may come into contact with the driver's body in the event of head-on or glancing collision). As compared with a conventional round bag, the inflated bag 11 in FIGS. 4, 5 and 6 therefore provides for greater protection for a given volume.

The FIGS. 4, 5 and 6 bag 11 is also asymmetrical, i.e. is not circularly symmetrical like conventional driver's airbags, so driver's airbag 9 is preferably housed in a fixed central hub 6 (i.e. that does not rotate together with steering wheel 8) to ensure bag 11 is oriented as designed in the event of collision.

Driver's airbag 9 as described above has numerous advantages: it is cheap and easy to produce, and, above all, despite being smaller in volume (roughly 60 liters), adequately safeguards the driver in the event of a head-on or glancing collision without a seat belt, by preventing the driver's trunk and head from hitting the rigid vehicle body parts in front, such as the frame posts or windscreen.

Though the above description refers by way of example to a driver's airbag, the design of driver's airbag 9 as described herein may also be applied in full to a similar front-passenger airbag.

The invention claimed is:

1. A steering wheel assembly provided with a front airbag for a road vehicle, the steering wheel assembly comprising:
    a steering column;
    a central hub connected rigidly to a free end of the steering column so that the central hub is fixed and does not rotate;
    a steering wheel extending about the central hub and mounted for rotation on the steering column;
    a stowage compartment arranged in the central hub;
    a bag of the front airbag normally deflated and folded inside the stowage compartment; and
    a generator which is housed inside the stowage compartment, is connected to the bag, and inflates the bag in the event of collision,
    wherein the inflated bag has a circular front section, except for: with an additional volume on top that extends outside the circular front section, has an arc-shaped front section and an angular width of 90°, and
    two voids on opposite sides, that extend inside the circular front section up to the start of the additional volume, are located in the top half of the inflated bag, and each having an angular width of 60°.

2. A steering wheel assembly as claimed in claim 1, wherein the additional volume has an arc-shaped front section of a height roughly equal to 20% of the radius of the front section of the inflated bag.

* * * * *